US00RE48017E

(19) United States
(12) Reissued Patent
Lang et al.

(10) Patent Number: US RE48,017 E
(45) Date of Reissued Patent: May 26, 2020

(54) VIEWING SYSTEM FOR VEHICLES, IN PARTICULAR COMMERCIAL VEHICLES

(71) Applicant: MEKRA Lang GmbH & Co. KG, Ergersheim (DE)

(72) Inventors: Werner Lang, Ergersheim (DE); Manuel Kunz, Roettingen (DE)

(73) Assignee: MEKRA Lang GmbH & Co. KG, Ergersheim (DE)

(21) Appl. No.: 15/849,942

(22) Filed: Dec. 21, 2017

Related U.S. Patent Documents

Reissue of:
(64) Patent No.: 9,667,922
Issued: May 30, 2017
Appl. No.: 14/173,859
Filed: Feb. 6, 2014

(30) Foreign Application Priority Data

Feb. 8, 2013 (DE) ..... 10 2013 002 111

(51) Int. Cl.
*H04N 7/18* (2006.01)
*B60R 1/00* (2006.01)

(52) U.S. Cl.
CPC ..... *H04N 7/183* (2013.01); *B60R 1/00* (2013.01); *B60R 2300/00* (2013.01)

(58) Field of Classification Search
CPC ... B60R 1/00; B60R 2300/00; B65H 2220/01; B65H 2301/4474; B65H 2301/4476; B65H 2301/44795; B65H 2220/02; B65H 2301/4322; B65H 2301/4352;
(Continued)

(56) References Cited

U.S. PATENT DOCUMENTS 5,760,828 A 6/1998 Cortes
6,292,111 B1 * 9/2001 Ishikawa ..... H04N 7/183 180/167
6,693,524 B1 2/2004 Payne
(Continued)

FOREIGN PATENT DOCUMENTS

CN 101636297 A 1/2010
CN 102823240 A 12/2012
(Continued)

OTHER PUBLICATIONS

United Nation, Addendum 45: Regulation No. 46, Revision 4, Oct. 3, 2012.
(Continued)

*Primary Examiner* — Peng Ke
(74) *Attorney, Agent, or Firm* — J-Tek Law PLLC; Jeffrey D. Tekanic; Scott T. Wakeman

(57) ABSTRACT

A viewing system for a vehicle, in particular a commercial vehicle, includes an image capture unit, a computing unit, and a reproducing unit. The image capture unit includes a lens, which has an optical axis, and a digital image sensing unit, and is configured to be attached to the vehicle such that a viewing area on the side of the vehicle is sensed with at least one part of a first legally-prescribed field of view and with at least one part of a second legally-prescribed field of view. The lens is disposed with respect to the digital image sensing unit such that the optical axis extends through the part of the first legally-prescribed field of view that is reproduced on the digital image sensing unit.

25 Claims, 2 Drawing Sheets

(58) Field of Classification Search
CPC ..... B65H 2301/4356; B65H 2405/352; B65H 39/075; H04N 7/183
See application file for complete search history.

(56) References Cited

U.S. PATENT DOCUMENTS

| | | | | |
|---|---|---|---|---|
| 6,744,380 | B2 * | 6/2004 | Imanishi | B60R 1/00 340/435 |
| 7,031,142 | B2 * | 4/2006 | Mishima | B60R 1/00 348/E5.027 |
| 7,079,017 | B2 | 7/2006 | Lang et al. | |
| 7,176,960 | B1 * | 2/2007 | Nayar | G06T 3/4038 348/207.99 |
| 7,253,833 | B2 * | 8/2007 | Imoto | H04N 7/183 348/148 |
| 7,454,128 | B2 | 11/2008 | Lang et al. | |
| 7,574,287 | B2 | 8/2009 | Lang et al. | |
| 7,697,055 | B2 | 4/2010 | Imoto et al. | |
| 7,825,951 | B2 | 11/2010 | Lang et al. | |
| 7,973,821 | B2 * | 7/2011 | Seo | H04N 5/232 348/137 |
| 8,199,975 | B2 * | 6/2012 | Pomerleau | B60R 1/00 340/937 |
| 8,284,258 | B1 * | 10/2012 | Cetin | H04N 7/183 348/169 |
| 8,624,716 | B2 | 1/2014 | Englander | |
| 8,953,011 | B2 | 2/2015 | Lang et al. | |
| 2001/0052845 | A1 | 12/2001 | Weis et al. | |
| 2002/0163589 | A1 | 11/2002 | Yukawa et al. | |
| 2003/0011597 | A1 * | 1/2003 | Oizumi | G06T 5/006 345/427 |
| 2003/0085999 | A1 | 5/2003 | Okamoto et al. | |
| 2003/0122930 | A1 | 7/2003 | Schofield et al. | |
| 2003/0214733 | A1 | 11/2003 | Fujikawa et al. | |
| 2004/0004541 | A1 | 1/2004 | Hong | |
| 2004/0036768 | A1 | 2/2004 | Green | |
| 2004/0169762 | A1 | 9/2004 | Imoto | |
| 2004/0223074 | A1 | 11/2004 | Takada | |
| 2005/0002545 | A1 * | 1/2005 | Yasui | B60R 1/00 382/104 |
| 2005/0083405 | A1 | 4/2005 | Imoto et al. | |
| 2005/0083427 | A1 | 4/2005 | Imoto | |
| 2006/0203085 | A1 * | 9/2006 | Tomita | H04N 13/0018 348/51 |
| 2006/0215020 | A1 | 9/2006 | Mori et al. | B60R 1/00 348/119 |
| 2006/0251502 | A1 | 11/2006 | Scharfenberger | |
| 2007/0209436 | A1 | 9/2007 | Akita et al. | |
| 2008/0122597 | A1 | 5/2008 | Englander | |
| 2008/0151048 | A1 | 6/2008 | Watanabe et al. | |
| 2008/0180351 | A1 | 7/2008 | He | |
| 2008/0246843 | A1 | 10/2008 | Nagata et al. | |
| 2008/0276191 | A1 | 11/2008 | Breed | |
| 2009/0146051 | A1 | 6/2009 | Ishikawa | |
| 2009/0213037 | A1 | 8/2009 | Schon | |
| 2009/0290369 | A1 | 11/2009 | Schofield et al. | |
| 2010/0091379 | A1 | 4/2010 | Lang et al. | |
| 2010/0110189 | A1 | 5/2010 | Kuboyama et al. | |
| 2010/0117815 | A1 | 5/2010 | Deline et al. | |
| 2010/0238288 | A1 | 9/2010 | Klaerner et al. | |
| 2011/0080277 | A1 | 4/2011 | Traylor et al. | |
| 2011/0115913 | A1 | 5/2011 | Lang et al. | |
| 2011/0317049 | A1 | 12/2011 | Kurane et al. | |
| 2012/0013742 | A1 | 1/2012 | Fairchild et al. | |
| 2012/0069184 | A1 | 3/2012 | Hottmann | |
| 2012/0154591 | A1 | 6/2012 | Baur et al. | B60R 1/00 348/148 |
| 2012/0194652 | A1 * | 8/2012 | Myokan | H04N 13/0022 348/50 |
| 2012/0200664 | A1 * | 8/2012 | Lang | B60R 1/00 340/435 |
| 2012/0300075 | A1 * | 11/2012 | Yamamoto | H01N 7/185 348/148 |
| 2013/0038735 | A1 | 2/2013 | Nishiguchi et al. | |
| 2013/0314539 | A1 | 11/2013 | Lang et al. | |
| 2014/0036081 | A1 | 2/2014 | Lang et al. | |
| 2014/0058653 | A1 | 2/2014 | Schofield et al. | |
| 2014/0114534 | A1 * | 4/2014 | Zhang | B60R 1/00 701/42 |

FOREIGN PATENT DOCUMENTS

| | | | |
|---|---|---|---|
| DE | 19539642 | A | 11/1996 |
| DE | 69509040 | | 12/1999 |
| DE | 19900498 | A | 7/2000 |
| DE | 10043099 | A1 | 3/2002 |
| DE | 10254035 | | 8/2004 |
| DE | 102004043257 | A | 4/2005 |
| DE | 102005028144 | A | 12/2006 |
| DE | 102006020511 | A | 11/2007 |
| DE | 102004043257 | | 2/2009 |
| DE | 102008034606 | A1 | 1/2010 |
| DE | 102011010624 | A1 | 8/2012 |
| EP | 1018839 | A2 | 7/2000 |
| EP | 1705623 | A | 9/2006 |
| EP | 2484558 | A | 8/2012 |
| EP | 2555518 | A | 2/2013 |
| GB | 2351055 | A | 12/2000 |
| JP | H0396938 | U | 10/1991 |
| JP | H0471939 | A | 3/1992 |
| JP | H0675932 | U | 10/1994 |
| JP | H0884277 | A | 3/1996 |
| JP | 2001114048 | A | 4/2001 |
| JP | 2002022463 | A | 1/2002 |
| JP | 2002109697 | A | 4/2002 |
| JP | 2002325191 | A | 11/2002 |
| JP | 2003219226 | A | 7/2003 |
| JP | 2003320911 | A | 11/2003 |
| JP | 2003327048 | A | 11/2003 |
| JP | 2007091186 | A | 4/2007 |
| JP | 2007110572 | A | 4/2007 |
| JP | 2007112368 | A | 5/2007 |
| JP | 2007282098 | A | 10/2007 |
| JP | 2007320359 | A | 12/2007 |
| JP | 2008054030 | A | 3/2008 |
| JP | 2008149764 | A | 7/2008 |
| JP | 2009141844 | A | 6/2009 |
| JP | 1020100089362 | A | 8/2010 |
| JP | 2011095321 | A | 5/2011 |
| JP | 2011193485 | A | 9/2011 |
| JP | 2012178150 | A | 9/2012 |

OTHER PUBLICATIONS

Translation of Office Action from related Japanese Patent Application No. 2014-022732—dated Feb. 10, 2015.
Translation of Office Action from related Korean Patent Applicalion No. 10-2014-0013755—dated Feb. 4, 2015.
Office Action from the Japanese Patent Office dated Sep. 8, 2015 for Japanese application No. 2014-116130, and translation thereof.
Non-final Office Action mailed Jun. 2, 2014 in related U.S. Appl. No. 13/367,985.
Communication from European Patent Office mailed Apr. 24, 2013 in related EP application No. 14153988.2, with English translation attached thereto.

* cited by examiner

VIEWING SYSTEM FOR VEHICLES, IN PARTICULAR COMMERCIAL VEHICLES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application claims priority from German patent application no. DE 10 2013 002 111.1 filed Feb. 8, 2013, the entire contents of which is incorporated by reference herein.

FIELD OF THE INVENTION

The present disclosure is directed to a viewing system for vehicles, in particular commercial vehicles, and, more specifically, to a viewing system including an image capture unit for use in commercial vehicles. Moreover, the present disclosure relates to a vehicle, in particular a commercial vehicle, which is equipped with a viewing system disclosed herein.

BACKGROUND

Fields of view (fields of vision) are legally prescribed (defined) for different types of motor vehicles, such as e.g., motorcycles, motor vehicles for transporting passengers, motor vehicles for transporting goods, etc. The fields of view must be provided by a device for indirect viewing, conventionally a mirror, and must be viewable permanently (continuously) and reliably at all times by a driver sitting in the driver's seat of the vehicle using the device for indirect viewing. Specific fields of view have been prescribed or defined by various countries, organizations and/or standards-setting bodies. For example, fields of view (vision) for rear-view mirrors, which must be viewable by the driver in a permanent an/or continuous and reliable manner, are legally prescribed in UN/ECE Regulation No. 46 for the European region.

For commercial vehicles, such as e.g., trucks or delivery vehicles, a primary (main) mirror is currently provided on each of the driver's side and the passenger's side as a device for indirect viewing. Using the primary (main) mirror, the vehicle driver can see a level (flat) and horizontal part of the road surface of a certain width that extends from a stipulated distance behind the vehicle driver's eye (ocular) points back to the horizon behind the vehicle. In addition, a narrower band of the road surface must also be viewable using this mirror, which band begins a shorter distance behind the driver's eye (ocular) points. Such legally-prescribed areas, which must be viewable permanently and at all times by the driver with the use of the devices for indirect viewing, will be designated as "fields of view (vision)". The area in the vicinity of the vehicle that is legally prescribed or required to be viewable using the primary mirror will be designated hereinafter as the "field of view of the primary (main) mirror." Such an area is also defined as field of view II (Class II) in UN/ECE Regulation No. 46.

In addition to these primary (main) mirrors, fields of view (vision), which are reproduced (shown or depicted) by wide-angle mirrors, are required to be viewable on both sides of the commercial vehicle. An area behind the eye (ocular) points of the driver is viewed with the wide-angle mirrors; this area is wider than the area that must be viewable in the primary mirrors, but it only extends a limited length along the vehicle—not to the horizon as is the case with the field of view of the primary (main) mirror. This area, the area viewable in the wide-angle mirrors, is defined as field of view IV (Class IV) in UN/ECE Regulation No. 46.

Various organizations may establish legally required fields of view for a main mirror. Currently, according to the field of view of Class II of UN/ECE Regulation No. 46, the field of vision of the exterior rear-view mirror on the driver's side and the exterior rear-view mirror on the passenger's side must allow the driver to see at least a 4 m wide, flat, horizontal portion of the road. This road portion is bounded on one side by a plane that a) is parallel to the median longitudinal vertical plane of the vehicle, b) passes through the outermost point of the vehicle on the driver's side and the passenger's side of the vehicle, respectively, and c) extends from a location 20 m behind the driver's eye (ocular points) to the horizon. In addition, a 1 m wide portion of the road must be visible to the driver in an area that is bounded by a plane a) parallel to the median longitudinal vertical plane of the vehicle, b) passing through the outermost point of the vehicle and c) extending from a location 4 m behind a vertical plane passing through the driver's eye (ocular points). In other words, the primary mirror must enable the driver to see a long wide portion of the road relatively far from the driver and a shorter, narrower portion of the road that is closer to the driver.

Various organizations may establish legally required fields of view for a wide-angle mirror. For example, Class IV of UN/ECE Regulation No. 46 defines a field of vision of the "wide-angle" exterior mirror on the driver's side and the "wide-angle" exterior mirror on the passenger's side. This wide angle field of view must allow the driver to see at least a 15 m wide, flat, horizontal portion of the road, that is bounded by a plane a) parallel to the median longitudinal vertical plane of the vehicle, b) passing through the outermost point of the vehicle on the driver's side and the passenger's side of the vehicle, respectively, and c) extending from a location at least 10 m to 25 m behind the driver's eye (ocular points). In addition, a 4.5 m portion of the road must be visible to the driver in an area that is bounded by a plane a) parallel to the median longitudinal vertical plane of the vehicle, b) passing through the outermost point of the vehicle, and c) extending from a point (location) 1.5 m behind a vertical plane passing through the driver's eye (ocular points).

Despite the use of prescribed mirrors or devices for indirect viewing (vision), however, it may be very difficult or nearly impossible for a vehicle driver to adequately keep accident-critical (accident-prone) areas around a commercial vehicle in view. In addition, the presence of multiple mirrors on typical vehicles makes it harder for the driver to keep all mirrors in view at the same time. The reproduction (depiction) of the fields of view using mirrors also has the consequence of an influence of the mirrors on the airflow around the vehicle.

With commercial vehicles such as trucks, buses, etc., the viewability on the driver's side is critical. Obstacles and other vehicles are often difficult to quickly and accurately identify in a mirror because, despite the specifications of legally-prescribed fields of view, relatively large blind spots still exist. The orientation of the driver relative to the multiple devices for indirect viewing changes as the driver moves his head and/or shifts his position in his seat, and this increases the likelihood that obstacles will be overlooked, in particular while turning or changing lanes, even though they are reproduced (shown) in the device for indirect viewing (and would be visible to the driver if his head were positioned in an ideal position). Accidents are thus frequently caused by the fact that drivers of commercial vehicles do not have sufficient viewability into lateral areas of the vehicle, in particular into the one or more blind spots, which are lateral areas adjacent to the vehicle. Even using the external mirrors described above, these lateral areas (the blind spots) are only barely visible by the driver, or are not visible at all.

It is becoming increasingly common to consider using camera systems or image capture systems as devices for indirect viewing, either in addition to conventional mirrors or as replacements therefor. In such camera systems or image capture systems an image capture unit continuously senses an image. The (video-) data sensed by the image capture unit are transmitted, e.g., using a computing unit, to a reproducing (display) device located in the driver's cabin. Optional further processing may be performed on the image before it is displayed. The reproducing (display) device depicts the corresponding legally-required field of view or a plurality of fields of view and optionally supplemental information, such as e.g., collision indications, distances and the like, for the area around the vehicle in a manner that is permanent (continuous) and viewable at all times by the driver.

DE 10 2011 010 624 A1 (corresponding to U.S. 2012/0200664) discloses a display device for legally-prescribed fields of view in a driver's cabin of a commercial vehicle. The display device includes at least one display adapted to display at least two of the legally-prescribed fields of view, permanently and in real time, on the display unit in the driver's cabin.

A camera unit and a device for monitoring a vehicle's surroundings are disclosed by DE 10 2004 043 257 B4 (corresponding to U.S. US 2005/083427). In this system a change of the image height with respect to a change of the image angle at a peripheral portion of the image is greater than in a center portion of the image.

It is also known to sense (capture) each of multiple legally-prescribed fields of view of a commercial vehicle using separate image capture units, respectively. In this case the image capture units are each aligned such that their optical axes, respectively, extend substantially through the centers of each of the sensed (captured) fields of view. The area of the image captured by the image capture unit has the highest reproduction quality at the optical axis, and the distortion, i.e. the optical distortion, increases with increasing distance from the optical axis.

Different requirements with respect to distortion are also placed on the image capture units for sensing (capturing) different legally-prescribed fields of view. For example, a first field of view must have only minimal distortion, whereas the distortion of a second field of view is less critical and thus it can be more distorted.

Furthermore, it is known to sense (capture) more than one legally-prescribed field of view using only one image capture unit. In this case the optical axis extends centrally through the viewing area captured by the image capture unit. However, this can lead to a distortion in each of the respective co-captured fields of view, because these co-captured fields of view do not necessarily lie in the central area.

SUMMARY OF THE INVENTION

Starting therefrom, it is an aspect of the present disclosure to provide a simple viewing system for a vehicle, in particular, for a commercial vehicle, that provides an optimal view of areas that are located laterally adjacent to the vehicle and that can depict the fields of view (fields of vision) with a desired reproduction quality in terms of optical distortion.

In the description of this invention, indications of the direction of a vehicle, in particular a commercial vehicle, are made with reference to the normal forward driving direction. Thus, "in the lateral direction" means the direction that is perpendicular to a forward driving direction vector of the motor vehicle and corresponds to the left-right direction. Furthermore, the term "viewing area" describes a maximum area which can be sensed (captured) by an image capture unit, for example by a camera. The term "field of view (vision)" differs therefrom in that it indicates an area which is legally prescribed to be seen by the driver. Therefore a "viewing area" generally describes an area which is larger than a legally-prescribed "field of view (vision)", and more than one field of view may be present in a viewing area.

An aspect of the present disclosure is to provide a viewing system for a vehicle, in particular a commercial vehicle, comprising an image capture unit, a computing unit connected to the image capture unit, and a reproducing (display) unit connected to the computing unit. It should be noted here that the image capture unit, the computing unit, and the reproducing unit are connected to one another in a communicative manner, and that the image capture unit, the computing unit, and the reproducing unit are not necessarily physically separate units. For example, the computing unit can be integrated in the image capture unit or in the reproducing unit. Furthermore, the term "image capture unit" should be understood to include any photographic device for capturing static or moving images, for example a camera or a wide-angle camera. The image capture unit comprises a lens (objective), which has an optical axis, and a digital image sensing unit, and is configured to be attached to the vehicle such that a viewing area on the side of the vehicle is sensed (captured), which viewing area includes at least one part of a first legally-prescribed field of view and at least one part of a second legally-prescribed field of view. Accordingly, the image capture unit can be attached, for example, to a front portion of a passenger's side of the vehicle, in order to capture the described first and second legally-prescribed fields of view on the passenger's side of the vehicle. The lens is disposed with respect to the digital image sensing unit such that the optical axis of the lens extends through the part of the first legally-prescribed field of view that is reproduced on (projected or mapped onto) the digital image sensing unit. This means that the optical axis does not usually lie in the image center of the image that is sensed (captured) on the image sensing unit, but rather is shifted towards the vehicle and/or possibly towards the driver's cabin of the vehicle (forwards; in accordance with the top of the picture). In other words, the portion of the image where the optical axis meets the image sensing unit, which portion is generally the least optically distorted, is not centered on the image sensing unit but rather is offset from the center of the image sensing unit.

Moreover, according to the present disclosure, a single image capture unit is used to capture two legally-prescribed fields of view which are located laterally adjacent to the vehicle while still keeping a level of distortion in critical areas of the captured image as low as possible. For this purpose, the optical axis is shifted such that the optical axis falls in the critical area, i.e. the optical axis does not lie in the center of the sensed and displayed captured image. The field of view II (Main exterior rear-view mirrors Class II) defined in the UN/ECE Regulation No. 46 can for example be referred to as the critical area; it is located laterally directly adjacent to the vehicle. It is desired that the distortion of the displayed field of view II (or similar field of view located laterally directly adjacent to the vehicle) be as low as possible. In order to achieve this, the optical axis is shifted towards the vehicle such that the optical axis extends through the legally-prescribed field of view II.

The use of a single image capture unit, which is configured for sensing (capturing) both lateral fields of view II and IV (or a first field of view laterally near the vehicle and a second field of view laterally further out from the vehicle), on one vehicle side leads to a simplified viewing system. Thus the computing unit is required to process a smaller amount of (video-) data and can therefore, e.g., improve the real-time display of the captured image. In addition, fewer data connections to the vehicle are needed, since only one image capture unit is provided per vehicle side, which image capture unit is communicatively connected to the computing unit.

The image capture unit is preferably connected to the computing unit via a first connection, for example a data cable suitable for digital transmission of the images sensed by the image capture unit. The computing unit is further connected to the reproducing (display) unit via a second connection, for example a data cable suitable for digital transmission of images. Alternatively, one or both of the above-mentioned connections can also be embodied in a wireless manner, for example via Bluetooth®, wireless local area network (WLAN), or an infrared connection.

The viewing system disclosed herein can sense (capture) a viewing area with at least parts of a first and second legally-prescribed field of view using a single image capture unit, and do so in a manner such that the distortion in the captured parts of the first and second legally prescribed field of view corresponds to specific requirements of reproduction quality, since the optical axis extends through the part of the particular field of view that is reproduced on (projected or mapped onto) the digital image capture unit and that is critical with respect to distortion and must have a low distortion. Altogether the viewing area sensed (captured) by the image capture unit preferably contains the entire first and second legally-prescribed field of view.

The image sensed by the image capture unit is generally a two-dimensional image which substantially corresponds to the shape of the digital image sensing unit. In the following discussion, the digital image sensing unit is considered to be an object having a negligible thickness, i.e. the digital image sensing unit can be considered to be a two-dimensional object.

The optical axis extends substantially orthogonally through the digital image sensing unit, so that a high-quality image can be sensed in terms of the resolution. The optical axis preferably extends eccentrically with respect to (is offset relative to) the geometric center of gravity of the digital image sensing unit, i.e. the optical axis does not extend through the geometric center of gravity of the digital image sensing unit. As a two-dimensional object, the digital image sensing unit thus has a centroid (center) which is preferably not traversed by the optical axis.

Furthermore, it is preferable that the digital image sensing unit has a substantially symmetric shape, and consequently has at least one axis of symmetry which extends in the plane defined by the digital image sensing unit. The term "substantially symmetric shape" is understood to mean, for example, regular polygons, such as for example rectangles and squares, circles, ellipses, etc. which have at least one axis of symmetry. In addition, the term "substantially symmetric shape" can also include shapes which deviate slightly from a symmetric shape. For example, a rectangle having, e.g., one or more obliquely truncated corners should be included within the term "substantially symmetric shape."

The optical axis is preferably displaced or offset or skewed or out of square with respect to at least one of the axes of symmetry of the digital image sensing unit, i.e. the optical axis does not intersect at least one axis of symmetry of the digital image sensing unit.

In other embodiments, it may be preferable that the optical axis extends through the vertical center, of a height-depth direction, of the part of the first legally-prescribed field of view that is reproduced on (projected or mapped onto) the digital image sensing unit. This leads to a uniformly low distortion in the horizontal direction in the part of the first legally prescribed field of view that is reproduced by the digital image sensing unit. Moreover, it is preferred that the optical axis extends through the horizontal center, i.e. of a center in the left-right direction, of the part of the first legally-prescribed field of view that is reproduced on (projected or mapped onto) the digital image sensing unit. This leads to a uniformly low distortion in the vertical direction in the part of the first legally-prescribed field of view that is reproduced by the digital image sensing unit, in particular in the part of the image which is preferably to be displayed nearly distortion-free. Furthermore it is preferable that the optical axis extend through the surface center of the part of the first legally-prescribed field of view that is reproduced on (projected or mapped onto) the digital image sensing unit. This leads to a uniformly low distortion in the vertical and horizontal directions in the part of the first legally-prescribed field of view that is reproduced by the digital image sensing unit in the part of the image which is to be displayed as distortion-free as possible.

The first legally-prescribed field of view preferably corresponds to a primary (main) mirror field of view, for example, the field of view II (Class II) defined in the UN/ECE Regulation No. 46 for primary (main) mirrors, and the second legally-prescribed field of view preferably corresponds to a wide-angle mirror field of view, for example, the field of view IV for wide-angle exterior mirrors ("Wide-angle" exterior mirror (Class IV)) defined in the UN/ECE Regulation No. 46. Here it is preferred that the main exterior mirror field of view II have only a small amount of distortion, whereas the distortion in the wide-angle external mirror field of view IV is less critical. Since the optical axis extends through the part of the main exterior mirror field of view II that is reproduced on (projected or mapped onto) the digital image sensing unit, the distortion in this part is lowest and can be provided to the driver of the vehicle in the desired degree of quality. The distortion in the wide-angle exterior mirror field of view IV is indeed greater, but due to the above-described fact that this distortion is less critical, the lesser reproduction quality of the wide-angle exterior mirror field of view IV is more acceptable.

The computing unit is preferably configured to receive an image sensed by the image capture unit and to modify it into a reproduced image containing the part of the first legally-prescribed field of view sensed by the image capture unit and the sensed part of the second legally-prescribed field of view in the reproduced image. The reproducing (display) unit is configured to be disposed in the interior of the vehicle so that it is visible by the driver and to display the reproduced image received from the computing unit. The computing unit can be integrally embodied with the image capture unit, the reproducing unit, or the control unit of the vehicle. Furthermore, the computing unit can be attached as a separate unit in or on the vehicle, e.g. integrally with an onboard computer. The reproducing unit can be a unit which visibly displays, in a manner suitable for the driver of the vehicle, the reproduced image provided by the computing unit. For example, the reproducing unit can be a separate device, for example an LCD, an LED, a projector, or the like. In addition, the reproducing unit can be integrally embodied with the so-called Central Information Display which is already located in the vehicle as a standard part.

Furthermore, it is preferred that the reproducing unit is configured to permanently (continuously) display the received reproduced image. Herein, "permanently" means that the display of the field of view is not (temporally) interrupted by other information, so that the driver can view the first and second legally-prescribed field of view by looking at the reproducing (display) unit. However, "permanently" also means that the display of the fields of view is consistently present at least during the driving operation of the commercial vehicle. The state described as and comprising "permanent" can also optionally be broadened to include the ignition state of the vehicle or, for example, a state in which a driver can be found in the vehicle, e.g. dependent on the detection (sensing) of a key device located in the vicinity of or inside the vehicle.

The image capture unit preferably includes a housing inside which the digital image sensing unit and a holding device for the digital image sensing unit are disposed and attached, and the lens or "objective", which for example can be an anamorphic lens, is also attached to the housing. The digital image sensing unit is preferably attached to the holding device by adhesion, welding, soldering, etc. The lens is preferably attached to the housing via a thread. In the sense used herein, the terms "lens" and "objective" encompass a lens system having at least one lens for focusing the image to be sensed (captured), and, in some embodiments, an aperture for taking a photograph. The aperture preferably has an opening, and the optical axis extends through the center of this opening. It should be noted that the extension of the optical axis can also be influenced by a special arrangement of the at least one lens and, as described above, the aperture, if present. In addition, the axial distance (spacing) between the lens and the digital image capture unit can be adjusted by turning (rotating) the lens in the thread such that the focusing of the image to be sensed (captured) is optimal. However, this adjustment is usually performed during manufacture and thus only once, when the lens (objective) is attached.

In order to achieve (ensure) that the optical axis extends through the part of the first legally-prescribed field of view that is reproduced on (projected or mapped onto) the digital image sensing unit, the digital image sensing unit may be attached so that it is centered on the holding device. The lens (objective) is attached to the housing such that it is disposed eccentric with respect to (off-center relative to) the holding device and accordingly also eccentric or off center with respect to the digital image sensing unit. In this case, the lens can be attached to the housing via a lens holder which includes a thread disposed eccentric with respect to the digital image capture unit; the thread can accommodate the lens in a screw-type manner. Alternatively, the lens can be attached to the lens holder by adhesion, welding, screws, or the like, wherein preferably the connection between lens and lens holder is such that it can be adjusted and aligned at least once during manufacture. In a further preferred design, the holding device and the lens are aligned concentric to each other, and the digital image sensing unit is attached to the holding device in a concentric manner, i.e. the centroid (center) of the attachment surface of the holding device is eccentric with respect to (offset relative to) the centroid (center) of the digital image sensing unit.

The digital image sensing unit is preferably a CMOS sensor which includes light-sensitive electronic components that are based on the internal photoelectric effect. The CMOS sensor can have a negligible thickness, so that the CMOS sensor can be considered to be a two-dimensional digital image sensing unit which is attached to the holding device. The digital image sensing unit preferably has a resolution of at least two megapixels.

The disclosed viewing system is preferably attached to a vehicle, in particular a commercial vehicle, with the digital image capture unit attached to the vehicle such that it can sense a viewing area on one side of the vehicle with at least one part of a first legally-prescribed field of view and with at least one part of a second legally-prescribed field of view. The image capture unit preferably senses the viewing area with the parts of the first and second legally prescribed field of view from a "bird's-eye" perspective, i.e. an object located in the viewing area is viewed from an eye (ocular) point located obliquely above the object. Using the capture (sensing) of the viewing area from a birds-eye perspective, the driver of the vehicle can view the first and second legally-prescribed field of view in an improved manner and, due to the improved image quality in the reproduced (displayed) part of the first legally-prescribed field of view, recognize traffic obstacles such as pedestrians and other vehicles in a timely manner.

Furthermore, it is preferable that the image capture unit is attached to the vehicle, in particular a commercial vehicle, such that the viewing area in the forward direction of the vehicle is sensed from front to rear. A sensing (capturing) of a viewing area "from front to rear" means that the viewing-area sensing (capture) is in a direction which is substantially parallel to a longitudinal direction of the vehicle and/or to a rearward driving direction of the vehicle.

The disclosed viewing system preferably includes an image capture unit with a single digital image sensing unit that is configured for sensing (capturing) at least one part of a first legally-prescribed field of view and at least one part of a second legally-prescribed field of view. The image capture unit thus does not include two image sensor units which would be formed for separate sensing (capturing) of the parts of the first and second fields of view.

Furthermore, it can be advantageous that the viewing system includes a further image capture unit that also includes a lens (objective) having an optical axis and a single digital image sensing unit on the opposite side of the vehicle from the first image capture unit. In this case, the further image capture unit is configured to sense a viewing area on the opposite side of the vehicle from the first image capture unit, which area includes at least one part of a first legally-prescribed field of view and at least one part of a second legally-prescribed field of view. In this case, the reproducing (display) unit can be further configured to display the two sensed (captured) viewing areas in a split-screen method so as to be viewable by the driver in the interior of the vehicle. In this case, the sensed viewing area of the driver's side is displayed on the driver's-side on the reproducing unit, and the sensed viewing area of the passenger's side is displayed on the passenger's-side on the reproducing unit. Thus, by looking at the reproducing (display) unit, the driver can view both viewing areas lateral to the vehicle. Alternatively, the viewing areas sensed (captured) on the two sides can be displayed separately from each other on two reproducing (display) units.

Using the viewing system disclosed herein, it is possible to sense (capture) a first legally-prescribed field of view and a second legally-prescribed field of view, for example the fields of view II and IV (Classes II and IV) defined in the UN/ECE Regulation No. 46, using only one digital image sensing unit, for example a CMOS sensor, while still meeting the requirements of the respective image reproduction qualities. By using only one digital image sensing unit, an economical system is thus disclosed, which further also results in fewer technical implementation costs, since the eccentric arrangement of the above-described elements of the image capture unit can already be incorporated in the development phase. In addition, the adjustment (change-over) for the driver from a wide-angle mirror to the viewing system disclosed herein is non-critical, since using the viewing system disclosed herein, the wide-angle field of view is displayed to the driver with the usual degree of distortion.

BRIEF DESCRIPTION OF THE DRAWINGS

The invention will be described in an exemplary manner in the following detailed description with reference to the accompanying figures.

DETAILED DESCRIPTION

Figure 1:
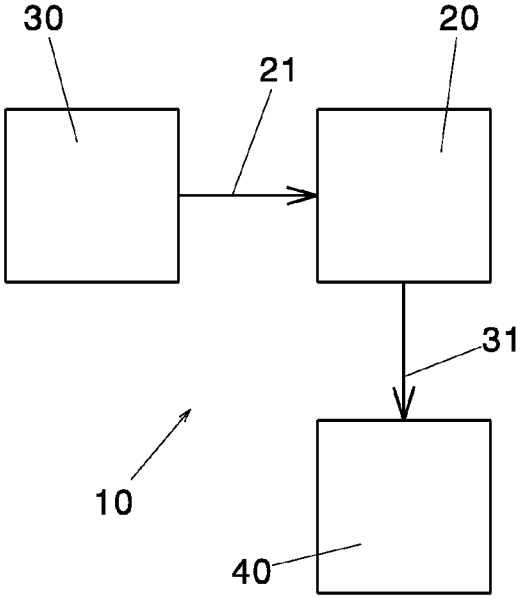
FIG. 1 shows a schematic illustration of a viewing system.

FIG. 1 schematically shows a viewing system 10. The viewing system 10, which for example can be used in a commercial vehicle such as a truck, comprises at least one image capture unit 30, a computing unit 20, and a reproducing (display) unit 40. The viewing area sensed (captured) by the image capture unit 30 is provided to a computing unit 20 via a first connection 21, for example a data cable suitable for digital transmission of the images captured by the image capture unit 30. The computing unit 20 can be configured to modify the sensed images in a desired manner into a reproduced (displayable) image. For example, the computing unit 20 can process one of the images received from the image capture unit 30 so that certain traffic objects are recognized and identified in the displayed image. The reproduced image modified by the computing unit 20 is then provided to the reproducing unit 40 via a second connection 31, for example a data cable suitable for digital transmission of images. The reproducing unit 40 is adapted to display the reproduced image to a driver of the commercial vehicle 50 in an easily viewable and photorealistic manner.

The computing unit 20 need not necessarily process the image sensed by the image capture unit 30. In some embodiments, the computing unit 20 is configured such that the image sensed by the image capture unit 30 is provided in an unaltered state as the reproduced image of the reproducing unit 40.

Figure 2:
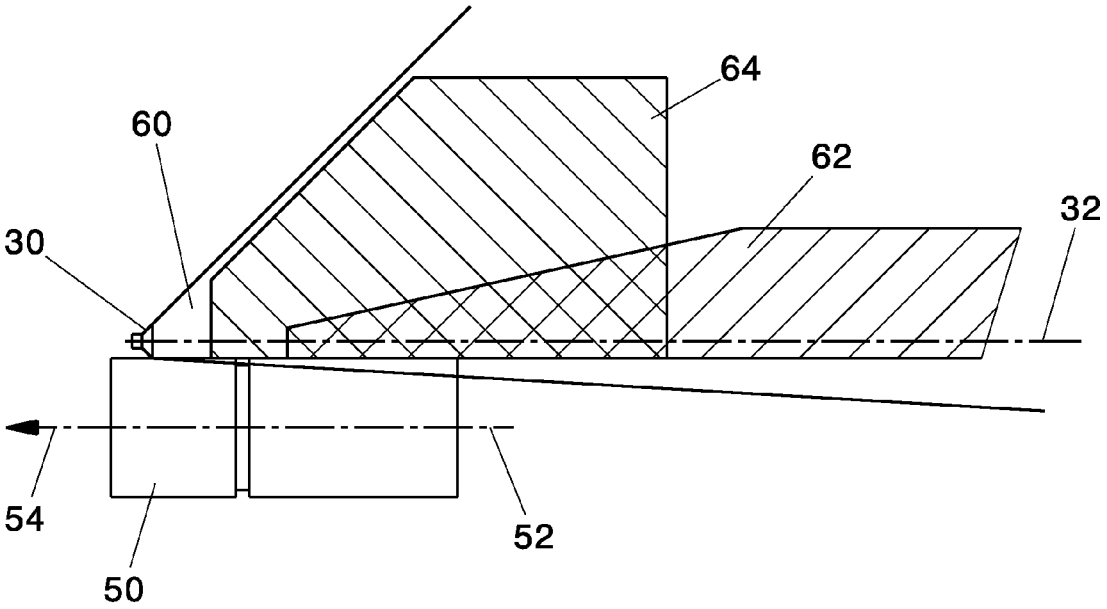
FIG. 2 shows a schematic illustration of a viewing system attached to a commercial vehicle and two legally-prescribed fields of view.

With reference to FIG. 2, a commercial vehicle 50 is shown which has a longitudinal axis 52 that extends substantially parallel to the forward driving direction, represented by an arrow 54. As shown in FIG. 2, the image capture unit 30 is located on the passenger's side of the commercial vehicle 50. The commercial vehicle 50 shown in FIG. 2 is a left-hand drive vehicle. However, the commercial vehicle 50 can also be a right-hand drive vehicle. In addition, for reasons of simplification, only one image capture unit 30 is shown. However, the disclosed viewing system 10 can also include a further image capture unit on the driver's side of the commercial vehicle 50, which further image capture unit has a similar configuration to the described passenger's-side image capture unit 30.

The image capture unit 30 shown in FIG. 2 is attached to the commercial vehicle 50 such that it can sense (capture) a viewing area 60 which is located laterally adjacent to the commercial vehicle 50, and that extends substantially from front to rear up to the horizon. Here the image capture unit 30 is configured such that the viewing area 60 includes at least one part of a legally-prescribed field of view (vision) 62, which for example corresponds to the field of view (vision) II (Class II) defined in the UN/ECE Regulation No. 46 for primary (main) exterior mirrors, and at least one part of a second legally-prescribed field of view (vision) 64, which for example corresponds to the field of view IV (Class IV) defined in the UN/ECE Regulation No. 46 for wide-angle exterior mirrors. As shown in FIG. 2, the viewing area 60 captured by the image capture unit 30 completely includes the first and second legally-prescribed fields of view (vision) 62, 64.

The image capture unit 30 further has an optical axis 32 which extends substantially parallel to the longitudinal axis 52 of the commercial vehicle 50. As shown in FIG. 2, the optical axis 32 extends through the first legally-prescribed field of view 62 and consequently need not necessarily extend centrally through the viewing area 60. Since the optical axis 32 extends through the first legally-prescribed field of view 62, the area of the sensed part, displayed by the reproducing unit 40 to the driver of the commercial vehicle 50, of the first legally-prescribed field of view 62 has a lesser distortion and higher reproduced image quality than the area of the sensed part of the second legally-prescribed field of view 64.

Figure 3:
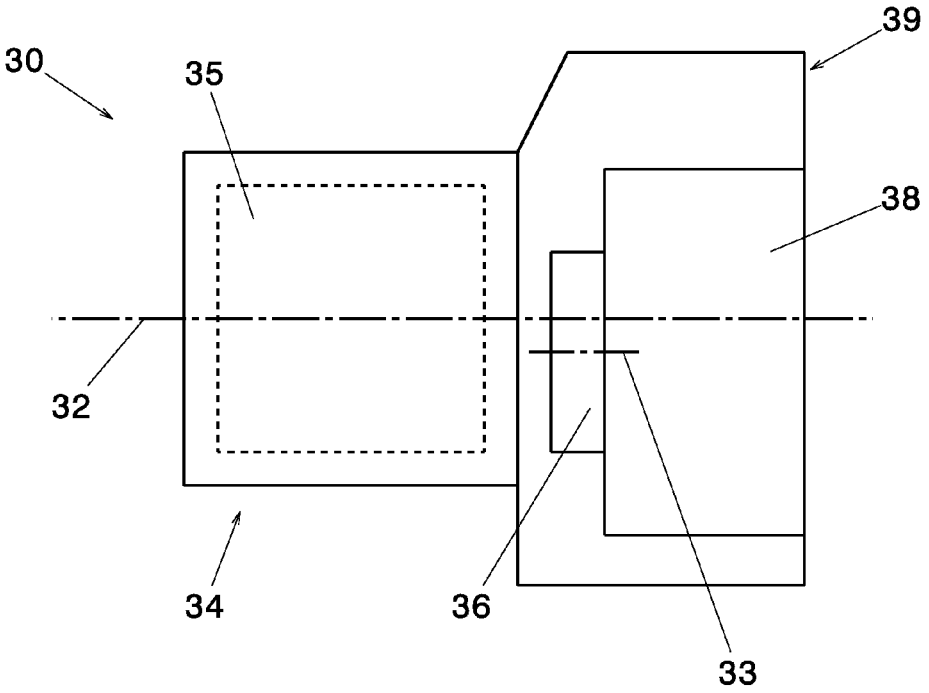
FIG. 3 shows a schematic illustration of an image capture unit of the viewing system.

With reference to FIG. 3, the individual components of the image capture unit 30 are shown in an exemplary manner. The image capture unit 30 includes a lens (objective) 34, a digital image sensing unit 36, a holding device 38, and a housing 39 in which the digital image sensing unit 36 and the holding device 38 are disposed. The lens (objective) 34 includes a lens and aperture system 35 which substantially define the extension of the optical axis 32 and can influence it by their arrangement. The lens 34 is attached to the housing 39 for example via a thread (not shown). As shown in FIG. 3, the digital image capture unit 36 is attached to the holding device 38, which is in turn attached to an interior side of the housing 39 in order to hold the digital image sensing unit 36 in a defined manner. The digital image sensing unit 36 shown in FIG. 3 is attached to the holding device 38 in an eccentric/off-center manner so that the digital image sensing unit 36 is also attached in an eccentric manner with respect to the lens 34. Here the dashed line 33 shows an axis orthogonal to the digital image sensing unit 36, which extends through the centroid (center) of the digital image capture unit and is spaced from the optical axis 32.

Figure 4:
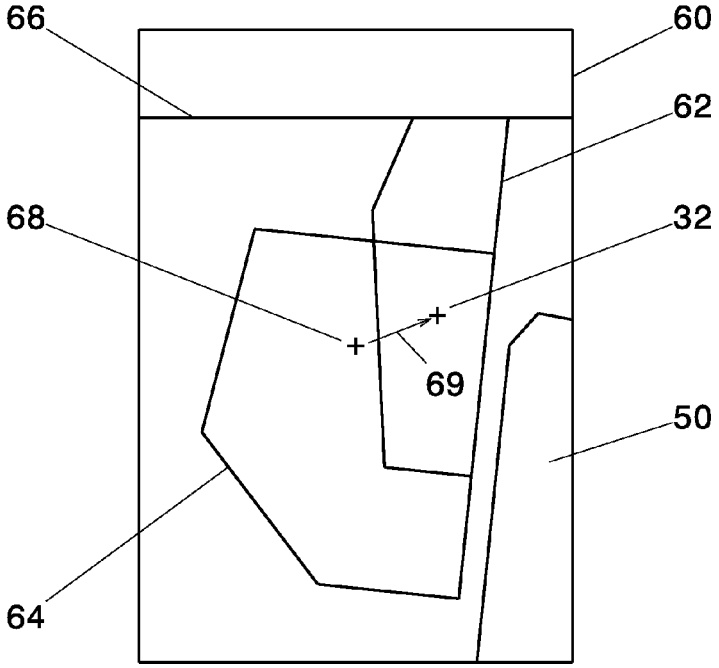
FIG. 4 shows a schematic illustration of a viewing area captured by the image capture unit of FIG. 3.

FIG. 4 shows a viewing area 60 sensed by the image capture unit 30 in an exemplary manner, which viewing area 60 completely encompasses the first legally-prescribed field of view (vision) 62 and the second legally-prescribed field of view (vision) 64. The viewing area 60 can be depicted by the reproducing unit 40 as a reproduced image modified by the computing unit 20 or, as shown in FIG. 4, unaltered. In FIG. 4, the horizon 66 is shown as well as a portion of the commercial vehicle 50 which is also sensed by the image capture unit 30, so that the driver of the commercial vehicle 50 can quickly and easily understand the orientation of the reproduced (displayed) image.

In addition, in FIG. 4 it is also apparent that the optical axis 32 is shifted from the center 68 of the viewing area 60 by an eccentricity or distance 69. In this case, the center of the viewing area 60 is a first distance from a plane at the side of the commercial vehicle 50, and the distance between the plane at the side of the vehicle and the optical axis 32 is about half the distance between the plane at the side of the commercial vehicle 50 and a parallel plane that includes the center 68. The center 68 lies within the second legally-prescribed field of view 64, but outside the first legally-prescribed field of view 62, which is the critical field of view. As was already mentioned, the optical axis 32 should be shifted from the center 68 of the viewing area 60 such that the optical axis 32 extends through the first legally-prescribed field of view 62 which is critical with respect to distortion. According to FIG. 4 an embodiment is shown in which the optical axis 32 lies close to the horizontal center of the legally-prescribed field of view 62. Consequently the optical distortion of the first legally-prescribed field of view 62 displayed on the reproduced image is low and the display of the first legally-prescribed and critical field of view 62 is better. The optical axis 32 is preferably shifted so far that it extends through the center of the first legally-prescribed field of view 62, which center is formed by the centroid.

REFERENCE NUMBER LIST

10 Viewing system
20 Computing unit
21 First connection
20 Computing unit
30 Image capture unit
31 Second connection
32 Optical axis
33 Axis of the digital image sensing unit
34 Lens (Objective)
35 Lens and aperture system
36 Digital image sensing unit
38 Holding device
39 Housing
40 Reproducing (Display) unit
50 Commercial vehicle
52 Longitudinal axis of the commercial vehicle
54 Forward driving direction
60 Viewing area
62 First legally-prescribed-field of view (vision)
64 Second legally-prescribed field of view (vision)
66 Horizon
68 Center of the viewing area
69 Eccentricity

The invention claimed is:

1. A vehicle equipped with a viewing system the viewing system comprising:

an image capture unit, a computing unit connected to the image capture unit, and a reproducing unit connected to the computing unit, wherein the image capture unit comprises a lens, which has an optical axis, and a digital image sensing unit, and is attached to the vehicle such that, in use, a viewing area on the side of the vehicle is sensed with at least a part of a first legally-prescribed field of view and at least a part of a second legally-prescribed field of view, wherein the lens is disposed with respect to the digital image sensing unit such that the optical axis intersects the part of the first legally-prescribed field of view that is reproduced on the digital image sensing unit at a point, and wherein the point is located between a center of the digital image sensing unit and a longitudinal centerline of the vehicle.

2. The vehicle according to claim 1, wherein the digital image sensing unit [is substantially symmetric and] has at least one axis of symmetry.

3. The vehicle according to claim 2, wherein the optical axis extends skewed with respect to at least one of the axes of symmetry of the digital image sensing unit.

4. The vehicle according to claim 1, wherein the optical axis extends through the vertical center of the part of the first legally-prescribed field of view that is reproduced on the digital image sensing unit.

5. The vehicle according to claim 1, wherein the optical axis extends through the horizontal center of the part of the first legally-prescribed field of view that is reproduced on the digital image sensing unit.

6. The vehicle according to claim 1, wherein the optical axis extends through the surface center of the part of the first legally-prescribed field of view that is reproduced on the digital image sensing unit.

7. The vehicle according to claim 1, wherein the first legally-prescribed field of view corresponds to the field of view II defined in the UN/ECE Regulation No. 46 for main exterior mirrors, and the second legally-prescribed field of view corresponds to the field of view IV defined in the UN/ECE Regulation No. 46 for wide-angle exterior mirrors.

8. A viewing system for a commercial vehicle, including:

an image capture unit comprising a lens having an optical axis and a digital image sensor having a sensor surface having a center point, the digital image sensor being positioned adjacent to the lens such that the optical axis intersects the sensor surface at an intersection point offset from the sensor surface center point;

a computing unit in communication with the image capture unit, and a reproducing unit in communication with the computing unit, wherein the computing unit is configured to receive an image sensed by the image capture unit and to modify it into a reproduced image such that the part of the first legally-prescribed field of view sensed by the image capture unit and the sensed part of the second legally-prescribed field of view are contained in the reproduced image, and the reproducing unit is configured to be disposed in the interior of the vehicle so as to be viewable by the driver and to display the reproduced image received from the computing unit.

9. The [vehicle] *viewing system* according to claim 8, wherein the image capture unit further includes a housing, in which the digital image sensing unit and a holding device for the digital image sensing unit are disposed, and wherein the lens is attached to the housing.

10. The [vehicle] *viewing system* according to claim 9, wherein the lens is [disposed eccentric with respect] *not centered relative* to the holding device and [with respect] *is not centered relative* to the digital image sensing unit.

11. The [vehicle] *viewing system* according to claim 9, wherein the digital image sensing unit is [disposed eccentric with respect] *not centered relative* to the holding device and *is not centered relative to* the lens.

12. The vehicle according to claim 1, wherein the digital image sensing unit is a CMOS or CCD sensor.

13. The vehicle according to claim 1, wherein the image capture unit is further configured to sense the viewing area from a birds-eye perspective.

14. The vehicle according to claim 1, wherein the image capture unit is attached to a side of the vehicle such that the viewing area is sensed from front to rear in the forward driving direction of the vehicle.

15. The vehicle according to claim 1, wherein the image capture unit comprises a single digital image sensing unit for sensing the parts of the first and second legally-prescribed field of view.

16. The vehicle according to claim 1, wherein the optical axis is offset from a center of the digital image sensing unit.

17. The [vehicle] *viewing system* according to claim 8, wherein the reproducing unit is configured to permanently display the reproduced image received from the computing unit.

18. The viewing system according to claim 8, wherein the image capture unit is configured to capture an image of a side of a vehicle to which the image sensor is attached and wherein the optical axis intersects the sensor surface at a location [substantially] midway between a first line including the side of the vehicle and a second, parallel, line including the center point of the sensor surface.

19. A vehicle equipped with a viewing system, the viewing system comprising:

an image capture unit, a computing unit connected to the image capture unit, and a reproducing unit connected to the computing unit, wherein the image capture unit comprises a lens, which has an optical axis, and a digital image sensing unit, and is attached to the vehicle such that, in use, a viewing area on the side of the vehicle is sensed with at least a part of a first legally-prescribed field of view and at least a part of a second legally-prescribed field of view, wherein the first legally-prescribed field of view is a view from a perspective of a driver of the vehicle of at least a 4 meter wide, flat, horizontal portion of a road bounded on one side by a plane that a) is parallel to a median longitudinal vertical plane of the vehicle, b) passes through an outermost point of the vehicle on a driver's side of the vehicle or a passenger's side of the vehicle, and c) extends from a location 20 meters behind an eye of the driver of the vehicle to the horizon, and of a 1 meter wide portion of the road bounded by a plane a) parallel to the median longitudinal vertical plane of the vehicle, b) passing through the outermost point of the vehicle, and c) extending from a location 4 meters behind a vertical plane passing through the eye of the driver of the vehicle, and wherein the lens is disposed with respect to the digital image sensing unit such that the optical axis extends through the part of the first legally-prescribed field of view that is reproduced on the digital image sensing unit.

20. The vehicle according to claim 19, wherein the optical axis extends through the vertical center of the part of the first legally-prescribed field of view that is reproduced on the digital image sensing unit.

*21. The vehicle according to claim 1, wherein*

*the computing unit is configured to receive an image sensed by the image capture unit and to modify it into a reproduced image such that the part of the first legally-prescribed field of view sensed by the image capture unit and the sensed part of the second legally-prescribed field of view are contained in the reproduced image, and*

*the reproducing unit is configured to be disposed in the interior of the vehicle so as to be viewable by the driver and to display the reproduced image received from the computing unit.*

*22. The vehicle according to claim 21, wherein the reproducing unit is configured to permanently display the reproduced image received from the computing unit.*

*23. The vehicle according to claim 21, wherein the image capture unit further includes a housing, in which the digital image sensing unit and a holding device for the digital image sensing unit are disposed, and wherein the lens is attached to the housing.*

*24. The vehicle according to claim 23, wherein the lens is not centered relative to the holding device and is not centered relative to the digital image sensing unit.*

*25. The vehicle according to claim 23, wherein the digital image sensing unit is not centered relative to the holding device and is not centered relative to the lens.*

* * * * *